United States Patent
Williams et al.

(10) Patent No.: US 11,036,616 B2
(45) Date of Patent: Jun. 15, 2021

(54) TRACING THE DATA PROCESSING ACTIVITIES OF A DATA PROCESSING APPARATUS

(71) Applicant: ARM LIMITED, Cambridge (GB)

(72) Inventors: Michael John Williams, Ely (GB); John Michael Horley, Hauxton (GB)

(73) Assignee: ARM LIMITED, Cambridge (GB)

(*) Notice: Subject to any disclaimer, the term of this patent is extended or adjusted under 35 U.S.C. 154(b) by 712 days.

(21) Appl. No.: 15/008,569

(22) Filed: Jan. 28, 2016

(65) Prior Publication Data

US 2016/0246543 A1    Aug. 25, 2016

(30) Foreign Application Priority Data

Feb. 25, 2015 (GB) ...................................... 1503152

(51) Int. Cl.
 *G06F 3/06* (2006.01)
 *G06F 11/36* (2006.01)

(52) U.S. Cl.
 CPC ........ *G06F 11/3636* (2013.01); *G06F 11/362* (2013.01); *G06F 11/3656* (2013.01)

(58) Field of Classification Search
 CPC .................................................. G06F 11/3636
 USPC ........................................................ 711/154
 See application file for complete search history.

(56) References Cited

U.S. PATENT DOCUMENTS

| | | | | |
|---|---|---|---|---|
| 6,594,262 B1 * | 7/2003 | Kwon | ................... | H03M 13/35 370/389 |
| 2002/0048450 A1 * | 4/2002 | Zetts | .................... | G11B 27/002 386/329 |
| 2004/0133698 A1 | 7/2004 | Swoboda et al. | | |
| 2004/0170169 A1 * | 9/2004 | Swoboda | ................ | H04L 43/50 370/389 |
| 2009/0271434 A1 * | 10/2009 | George | ............... | G06F 11/3636 |
| 2011/0149966 A1 * | 6/2011 | Pope | ....................... | H04L 49/30 370/392 |
| 2012/0002717 A1 * | 1/2012 | Ma | ................... | H04N 21/44209 375/240.01 |
| 2012/0063595 A1 * | 3/2012 | Massoudi | ............ | H04N 7/1675 380/210 |

OTHER PUBLICATIONS

Embedded Trace Macrocell, ETMv1.0 to ETMv3.5, Architecture Specification, 2011, ARM Limited.*
Search Report for GB 1503152.9 dated Aug. 6, 2015, 3 pages.

* cited by examiner

*Primary Examiner* — David Yi
*Assistant Examiner* — Zubair Ahmed
(74) *Attorney, Agent, or Firm* — Nixon & Vanderhye, P.C.

(57) ABSTRACT

An apparatus for generating a trace stream, a method for generating a trace stream, an apparatus for receiving a trace stream and a method of receiving a trace stream are provided. Header items and payload items in the trace stream are respectively grouped together into a contiguous sequence of header items and a contiguous sequence of payload items. This can for example facilitate the production of a trace stream in which the trace stream is aligned to a predetermined length (e.g. corresponding to an alignment of a memory in which the trace stream is to be stored) thus facilitating its interpretation.

25 Claims, 11 Drawing Sheets

|  | Byte #0 | 1 | 2 | 3 | 4 | 5 | 6 | Byte #7 |
|---|---|---|---|---|---|---|---|---|
| Byte #0 | 0x02 | 0xE1 | 0xE9 | 0xEA | 0xC4 | 0xC5 | 0x41 | 0x09 |
| 8 | 0xAC | 0xAD | 0x80 | 0x82 | 0x07 | 0x00 | 0x00 | 0x03 |
| 16 | Timestamp ||||||||
| 24 | VA #1 ||||||||
| 32 | VA #2 ||||||||
| 40 | CONTEXTIDR_EL1 |||| CONTEXTIDR_EL2 ||||
| Byte #48 | Count #0 || Count #1 || Source ID | 0x67 | 0x00 | 0x00 |

FIG. 2A

| 0x02 | 0x0E |  |  |  |  |  |  |
|---|---|---|---|---|---|---|---|
|  |  |  |  |  |  | 0x00 | 0x00 |

FIG. 2B

| 0x0F |  |  |  |  |  |  |  |
|---|---|---|---|---|---|---|---|
|  |  |  |  |  | 0x00 | 0x00 | 0x00 |

FIG. 2C

| 0x02 |  |  |  |  |  |  |  |
|---|---|---|---|---|---|---|---|
|  |  |  |  |  | 0x00 | 0x00 | 0x02 |

FIG. 2D

| Byte #0 | +1 | +2 | +3 | +4 | +5 | +6 | +7 |
|---|---|---|---|---|---|---|---|
| 0x02 | 0xE1 | 0xE9 | 0xEA | 0xC4 | 0xC5 | 0x71 | 0x12 |
| Flags | | | Timestamp | | | | |
| | | | PC | | | | |
| | | | Data address | | | | |
| | | | CONTEXTIDR_EL1 | | | | |
| 0x02 | 0xB1 | 0xB2 | 0xA2 | 0xA0 | 0x08 | 0x45 | 0x00 |
| Issue→Addr count | | Addr→Data count | | Event mask (0x011E) | | Source ID | |
| UNKNOWN | UNKNOWN | UNKNOWN | UNKNOWN | UNKNOWN | UNKNOWN | UNKNOWN | UNKNOWN |

(Row offsets: Byte #0, +8, +16, +24, +32, +40, +48, +56)

Row +32: CONTEXTIDR_EL1
Row +40: CONTEXTIDR_EL2

FIG. 4A

TRACING THE DATA PROCESSING ACTIVITIES OF A DATA PROCESSING APPARATUS

This application claims priority to GB Patent Application No. 1503152.9 filed 25 Feb. 2015, the entire contents of which is hereby incorporated by reference.

TECHNICAL FIELD

The present disclosure relates to the field of data processing. More particularly, it relates to tracing the data processing activities of a data processing apparatus.

BACKGROUND

It is known to provide a trace unit in association with a data processing apparatus, wherein the trace unit generates a trace stream which is indicative of the data processing activities of the data processing apparatus. This can be of particular use when the data processing apparatus is embodied as a system-on-chip, since otherwise some details of the data processing activities of the data processing apparatus would remain relatively unknown to the external observer. Nevertheless, in particular in the context of a system-on-chip, the amount of information which the trace unit is able to provide in the trace stream is somewhat constrained, because there is generally only a rather limited interface by which the trace unit can communicate with the outside world. This is due to the fact that connections on the periphery of the system-on-chip are at a premium, and viewed purely from the point of view of data processing would ideally all be configured to allow the data processing apparatus to perform its data processing activities, for example sending and receiving signals on and off chip, retrieving data from off-chip sources and writing data to off-chip locations and so on. The diagnostic functionality that the provision of a trace unit in association with the data processing apparatus gives is nonetheless considered to be sufficiently valuable that on-chip space for the provision of the trace unit itself and one or more connections on the periphery of the chip may be dedicated to this purpose.

Due to the constraints on the amount of data that can be communicated in the trace stream due to the bandwidth limitations of the interface by which the trace stream is transmitted, it is further known for the trace unit to filter the activities of the data processing apparatus so that indications corresponding to only a subset of those data processing activities are included in the trace stream. Appropriate selection of this subset can enable the off-chip observer to understand the data processing activities of the data processing apparatus, for example when the data processing apparatus is executing a sequence of instructions it is only necessary to provide indications in the trace stream corresponding to branch points in that sequence of instructions, since it is known that a sequence of instructions without branching must necessarily be atomically executed, and therefore an indication of the execution of each instruction in that sequence is not necessary.

There remains the opportunity to improve on known trace units and tracing techniques.

SUMMARY

Viewed from a first aspect the present techniques provide an apparatus for generating a trace stream indicative of data processing activities of a data processing apparatus, the apparatus comprising: trace stream generation circuitry to generate the trace stream, wherein the trace stream comprises header items and payload items, wherein each payload item is associated with a header item and the header item provides interpretation information for the payload item, and the trace stream generation circuitry is capable of grouping a set of header items together into a contiguous sequence of header items in the trace stream and grouping a set of payload items together into a contiguous sequence of payload items in the trace stream.

Viewed from a second aspect the present techniques provide a data processing system comprising an apparatus of the first aspect.

Viewed from a third aspect the present technique provide a method generating a trace stream indicative of data processing activities of a data processing apparatus, the method comprising the steps of: receiving information related to the data processing activities of a data processing apparatus; generating header items and payload items from the received information, wherein each payload item is associated with a header item and the header item provides interpretation information for the payload item; and grouping a set of header items together into a contiguous sequence of header items in the trace stream and to group a set of payload items together into a contiguous sequence of payload items in the trace stream.

Viewed from a fourth aspect the present techniques provide an apparatus for generating a trace stream indicative of data processing activities of a data processing apparatus, the apparatus comprising: means for receiving information related to the data processing activities of a data processing apparatus; means for generating header items and payload items from the received information, wherein each payload item is associated with a header item and the header item provides interpretation information for the payload item; and means for grouping a set of header items together into a contiguous sequence of header items in the trace stream and to group a set of payload items together into a contiguous sequence of payload items in the trace stream.

Viewed from a fifth aspect the present techniques provide an apparatus for receiving a trace stream indicative of data processing activities of a data processing apparatus, the apparatus comprising: trace stream reception circuitry to receive the trace stream, wherein the trace stream comprises header items and payload items; and trace stream processing circuitry to identify a contiguous sequence of header items and a contiguous sequence of payload items in the trace stream, and to identify a header item for each payload item and process each payload item in dependence on the header item.

Viewed from a sixth aspect the present techniques provide a method of receiving a trace stream indicative of data processing activities of a data processing apparatus, comprising the steps of: receiving the trace stream, wherein the trace stream comprises header items and payload items; identifying a contiguous sequence of header items and a contiguous sequence of payload items in the trace stream; identifying a header item for each payload item; and processing each payload item in dependence on the header item.

Viewed from a seventh aspect the present techniques provide an apparatus for receiving a trace stream indicative of data processing activities of a data processing apparatus, the apparatus comprising: means for receiving the trace stream, wherein the trace stream comprises header items and payload items; means for identifying a contiguous sequence of header items and a contiguous sequence of payload items in the trace stream; means for identifying a header item for each payload item; and means for processing each payload item in dependence on the header item.

BRIEF DESCRIPTION OF THE DRAWINGS

The present techniques will be described further, by way of example only, with reference to embodiments thereof as illustrated in the accompanying drawings, in which:

FIG. 2A shows an example structure of a portion of the trace stream in one embodiment;

FIGS. 2B, 2C and 2D show three example configurations of the sequence of header items in the trace stream in embodiments;

FIG. 4A shows an example portion of the trace stream in some embodiments, in which contiguous sequences of header items and payload items are generated to have a total length corresponding to a predetermined length;

DESCRIPTION OF EMBODIMENTS

Figure 1:
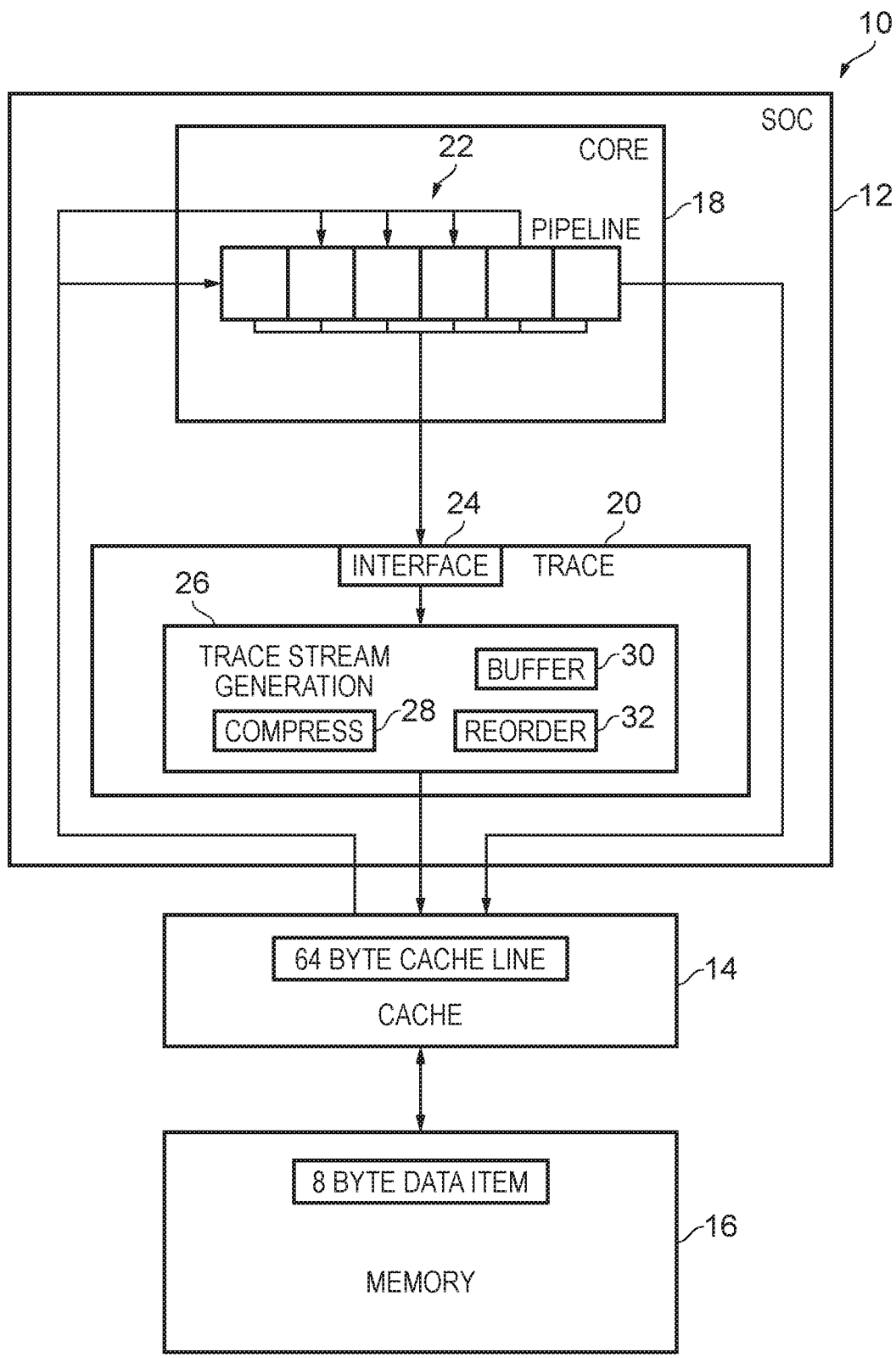
FIG. 1 schematically illustrates a data processing system comprising a data processing apparatus with which there is associated a trace unit according to one embodiment.

At least some embodiments provide an apparatus for generating a trace stream indicative of data processing activities of a data processing apparatus, the apparatus comprising: trace stream generation circuitry to generate the trace stream, wherein the trace stream comprises header items and payload items, wherein each payload item is associated with a header item and the header item provides interpretation information for the payload item, and the trace stream generation circuitry is capable of grouping a set of header items together into a contiguous sequence of header items in the trace stream and grouping a set of payload items together into a contiguous sequence of payload items in the trace stream.

When generating a trace stream, the apparatus (which in the embodiments described herein is referred to as a "trace unit") produces the trace stream in a format in which header items are grouped together and in which payload items are grouped together. For example, the trace stream may be generated in a format in which a sequence of header items is followed by a sequence of payload items, the header and payload items being associated with one another in that a header item is provided for each of the payload items and provides interpretation information for that payload item. This grouping together of header items and of payload items differs from a simple "stream of consciousness" approach to tracing, in which header item payload item pairs are generated and added to the trace stream as soon as they are generated.

The present techniques recognise that grouping together the header items and grouping together the payload items can have various advantages. It will be recognised that in order to perform this grouping together, and indeed in order to interpret it at a reception of the trace stream, capability must be provided to perform the necessary grouping and interpretation. Nevertheless, the present techniques recognise that the various possibilities that this grouping allows can make the provision of this capability worthwhile.

In some embodiments, the trace stream generation circuitry is capable of generating the trace stream comprising a group start header item as a first header item in the contiguous sequence of header items. Whilst each payload item in the trace stream has an associated header item (indicating how that payload item should be interpreted), other header items in the trace stream may be used to indicate other features of the content or structure of the trace stream. A group start header item as the first header item in the contiguous sequence of header items is an example of such a header item, which does not have a specific payload item associated with it. Moreover, as the first header item in the contiguous sequence of header items, this group start header item can be used to indicate a variety of characteristics of the contiguous sequence of header items.

For example, in some embodiments an encoding of the group start header item is indicative of the number of header items in the contiguous sequence of header items. Thus, the group start header item may be used to give an indication of the length of the contiguous sequence of header items, such that the recipient of the trace stream knows where the contiguous sequence of header items ends and the contiguous sequence of payload items begins. Moreover, by the use of an explicit length indication for the contiguous sequence of header items such as this, the need for each header item in the contiguous sequence of header items to be explicitly defined is removed since if an undefined header item or portion of the contiguous sequence of header items is encountered by the recipient of the trace stream, the fact that this item or portion is undefined can be recognised by the recipient by virtue of knowing the defined length of the contiguous sequence of defined header items. The particular form that this encoding of the group start header item takes may vary, but in some embodiments the value of the group start header item itself may explicitly be the number of header items in the contiguous sequence of header items. In other embodiments selected values of the group start header item can be used to indicate particular numbers of header items in the contiguous sequence of header items according to some predefined mapping, without any need for a selected value to match (in numerical value) its indicated numbers of header items.

Whilst the group start header item itself may have an encoding which indicates the length (e.g. number of header items) in the contiguous sequence of header items, in some embodiments the trace stream generation circuitry is capable of generating the trace stream comprising a length indication header item adjacent to the group start header item, wherein the length indication header item is indicative of the number of header items in the contiguous sequence of header items. The length indication header item may for example be a prefix to (i.e. preceding) a group start header item, or may follow the group start header item. This expands the range of sizes of the contiguous sequence of header items that may be defined, since two header items are used, rather than one, thus doubling the encoding space available for this purpose.

Instead of indicating the length of the contiguous sequence of header items, in some embodiments the trace stream generation circuitry is capable of generating the trace stream comprising a group end header item as a last header item in the contiguous sequence of header items. As such, the contiguous sequence of header items is then "bracketed" by the group start header item and the group end header item enabling the recipient of the trace stream to readily identify the start and end of the contiguous sequence of header items. The group start header item and group end header item may have their own unique encodings, but in some embodiments the group start header item and the group end header item are identical. The context would typically allow the recipient of the trace stream to know whether the header item is a group start or a group end header item and thus encoding space can be saved by using the same encoding for both.

In some embodiments the trace stream generation circuitry is capable of adding at least one dummy header item to the contiguous sequence of header items, such that the contiguous sequence of header items has a length which is a multiple of a predetermined length. In a trace stream where header items and payload items appear in sequential pairs, a problem is that the payloads will typically be misaligned in memory (with respect to the "natural" byte boundaries defined for the memory, e.g. 8-byte boundaries) which is inefficient to process. Indeed, a typical trace packet will be a power-of-two payload with an associated single byte header, so this is inevitable. Whilst one approach to this problem would be to pad each packet out to the next desired alignment boundary (for example a boundary defined by sets of 8 bytes—referred to herein as "an 8-byte boundary"), this can waste a lot of space in the trace stream, which as explained above is at a premium. However, according to the present techniques, in which the trace stream comprises a contiguous sequence of header items and a contiguous sequence of payload items, when generating the trace stream the trace stream generation circuitry may add at least one dummy header item to the contiguous sequence of header items to ensure that the sequence has a predetermined length. In particular it is ensured that it has a multiple of a predetermined length, where for example the predetermined length may be the above mentioned set of 8-bytes giving the alignment boundary, and thus the contiguous sequence of header items will end at this 8-byte boundary. Subsequent processing of the trace stream is thus made more efficient.

Similarly, in some embodiments the trace stream generation circuitry is capable of adding at least one dummy payload item to the contiguous sequence of payload items, such that the contiguous sequence of payload items has a length which is a multiple of a predetermined length. Hence, in the same manner, the trace generation circuitry can ensure that the contiguous sequence of payload items matches the predetermined length, e.g. the above mentioned 8-byte boundary, and the subsequent processing of the trace stream is similarly improved.

Further, the alignment of the contiguous sequence payload items with the predetermined length may also be achieved without explicit dummy payload items, since the header items of the trace stream may be used to indicate where the contiguous sequence of payload items begins and ends (and therefore it can be inferred that a portion of the contiguous sequence of payload items has not been made use of to carry required information in the trace stream). For this purpose in some embodiments the trace stream generation circuitry is capable of generating the contiguous sequence of payload items comprising at least one unspecified portion, such that the contiguous sequence of payload items has a length which is a multiple of a predetermined length.

Further, it may be desirable that the contiguous sequence of header items and the contiguous sequence of payload items together have a predetermined length (or a multiple thereof) and in some embodiments the trace stream generation circuitry is capable of adding at least one dummy payload item to the contiguous sequence of payload items or generating the contiguous sequence of payload items comprising at least one unspecified payload item, such that the contiguous sequence of header items and the contiguous sequence of payload items together have a predetermined length. It can therefore be provided that the contiguous sequence of header items and the contiguous sequence of payload items together have a fixed format (at least in terms of length), which may facilitate the reception, storage, processing and interpretation of the trace stream, by virtue of the regular length of the header/payload sequences. This regular length may for example be 8-byte boundary aligned as described above, it may also for example correspond to a cache line length (e.g. 64-byte length), and so on.

In some embodiments the trace stream generation circuitry is capable of generating the trace stream comprising an alignment header item, wherein the alignment header item follows a last header item in the contiguous sequence of header items which provides interpretation information for at least one referenced payload item in the contiguous sequence of payload items, and wherein the alignment header item is indicative that header items or payload items which follow the at least one referenced payload item up to a length of header items and payload items together which is an multiple of a predetermined length are not indicative of the data processing activities of the data processing apparatus. Thus, this alignment header item can be used by the trace generation circuitry to indicate where the next meaningful item in the trace stream (e.g. the start of the following contiguous sequence of header items) is to be found after the conclusion of that predetermined length (or multiple thereof). For example, the alignment header item may indicate that the start of the contiguous sequence of header items begins after the next predetermined format length boundary (e.g. 64-byte boundary). The alignment header item follows (though need not be directly adjacent to) the last header item in the contiguous sequence of header items which provides interpretation information for at least one referenced payload item in the contiguous sequence of payload items. The recipient of the trace stream can thus ignore items which follow that last referenced payload item until the next predetermined format length boundary (e.g. 64-byte boundary) is reached.

The particular manner in which the apparatus (trace unit) is provided in order to generate the items in the trace stream as a contiguous sequence of header items and a contiguous sequence of payload items may take a variety of forms, but in some embodiments the trace stream generation circuitry further comprises buffer circuitry and reorder circuitry, the buffer circuitry to buffer header items and payload items, and the reorder circuitry to reorder header items and payload items buffered in the buffer circuitry for inclusion in the trace stream.

The apparatus may make use of the buffer circuitry and reorder circuitry in a variety of ways in order to reorder the header items and payload items, but in some embodiments the reorder circuitry is capable of reordering the header items and payload items such that a largest payload item of the contiguous sequence of payload items is first in the contiguous sequence of payload items. By arranging the largest payload item to appear first in the contiguous sequence of payload items, a "natural" alignment of the trace stream can thus be provided, since it will always be possible to pad out smaller payload items in the contiguous sequence of payload items to match the length of the largest payload item.

Each header item in the contiguous sequence of header items may have an independent meaning, but in some embodiments the trace stream generation circuitry is capable of including a prefix header item in the contiguous sequence of header items, wherein presence of the prefix header item in the contiguous sequence of header items modifies a meaning of the header item which follows the prefix header item. This affords flexibility in the definition of the header items, and in particular allows an expansion of the possible range of meanings of the header item which follows the prefix header item.

In some embodiments the trace stream generation circuitry further comprises compression circuitry for applying a compression to the contiguous sequence of header items in the trace stream. As mentioned above, the bandwidth of the interface over which the trace stream is provided is typically rather limited and it may therefore be desirable to compress the trace stream where possible. This approach is supported by the present techniques, in which header items are provided as a contiguous sequence, since the regularity of a contiguous sequence of header items, which will typically have a relatively limited number of different formats or encodings, lends itself well to compression. The particular type of compression may take a variety of forms, such as run-length compression to take advantage of repeated sequences which may be found in the contiguous sequence of header items, Huffman or arithmetic coding to take advantage of particular header items or sets of header items which regularly appear, a dictionary encoding to also take advantage of header items or groups of header items which regularly appear, and so on.

In some embodiments the compression circuitry is further capable of applying the compression to the contiguous sequence of payload items in the trace stream. The degree of compression which may be achievable with respect to the contiguous sequence of payload items will (like all compression) depend on the particular content of those items, and where sufficient regularity in the payload items is present, a useful degree of compression with respect to the payload items may also be achieved.

The header items in the trace stream may have a variety of meanings, but in some embodiments the header items are branch indicators and each branch indicator indicates whether the data processing apparatus has taken a branch when performing the data processing activities. A particular technique (as mentioned above), when generating a trace stream with respect to the data processing activities of a data processing apparatus which is executing a sequence of data processing instructions, is to generate trace items only for points within that sequence of data processing instructions where a conditional branch is to be found (since otherwise it can be expected that the data processing apparatus simply proceeds sequentially through other data processing instructions). The particular format in which the header items which are branch indicators are produced may vary, but a compact trace stream may be achieved by having a minimum sized header item (e.g. single byte) encoded to either indicate "taken" or "not taken" in order to provide these branch indicators.

An indication of "taken" or "not taken" as appropriate may be sufficient to trace the sequence of data processing instructions which the data processing apparatus has taken. However, it may also be the case that the target address to which the data processing apparatus branches may not be able to be inferred, for example where that target memory address is itself referenced or retrieved. In this situation in some embodiments at least one payload item represents a memory address at which an instruction is stored, wherein the data processing apparatus has taken the branch to the instruction when performing the data processing activities. The association between header items and payload items of the present techniques can thus be made use of in order to provide the recipient of the trace stream with the target memory address taken by the branch.

In some embodiments the trace stream generation circuitry is capable of generating the contiguous sequence of payload items wherein a starting position of at least one payload item is delayed in the contiguous sequence of payload items so that the starting position of the at least one payload item is aligned with a multiple of a predetermined offset from a start of the contiguous sequence of payload items. Aligning the start of a payload item with a multiple of a predetermined offset from the start of the contiguous sequence of payload items allows that payload item to be aligned with respect to a given logical boundary, such as the above mentioned byte boundaries defined for a memory, e.g. 8-byte boundaries.

The particular manner in which the trace stream generation circuitry delays the starting position of the at least one payload item may take a variety of forms, but in some embodiments the trace stream generation circuitry is capable of delaying the starting position of the at least one payload item in the contiguous sequence of payload items by adding at least one unspecified portion prior to the at least one payload item. In other words since the header items of the trace stream can indicate to the recipient the length of each of the payload items, the recipient can then know where each payload item begins and ends, since it can be known that payload items will be aligned appropriately for their length, e.g. a header with an 8-byte payload implies that the payload starts on an 8-byte boundary or a header with a 4-byte payload would be aligned to a 4-byte boundary. In turn this means that after a first payload item ends, if this is not at a position where it is known that the next payload item must begin, the recipient can know that the content of the trace stream between the end of the first payload item and the beginning of the next payload item is meaningless, and any arbitrary data can be used to fill this space. An explicit dummy (i.e. predefined) payload item could be used to fill this space but this is not necessary.

Some embodiments provide a data processing system which comprises an apparatus (trace unit) according to one of the embodiments discussed above.

Such a data processing system may comprise a data storage device having a configuration in which access to stored data is made in units of the predetermined length. For example this data storage device may be a cache memory, an external memory, or indeed any other form of storage in which accesses to the data stored therein are made in particular length units. For example in the context of a cache memory, this may be a cache line length (e.g. 64-byte length), or in the context of an external memory this may be the data alignment of memory accesses (e.g. 8-byte) of that memory. Accordingly, in embodiments in which the contiguous sequence of header items and/or the contiguous sequence of payload items are generated having a length which is a multiple of the predetermined length, it is provided that the content of the generated trace stream will be aligned with the configuration of the data storage device. More efficient usage of that data storage device is thus made and processing of the stored trace stream is thus simplified for the recipient.

In at least some embodiments there is provided a method of generating a trace stream indicative of data processing activities of a data processing apparatus, the method comprising the steps of: receiving information related to the data processing activities of a data processing apparatus; generating header items and payload items from the received information, wherein each payload item is associated with a header item and the header item provides interpretation information for the payload item; and grouping a set of header items together into a contiguous sequence of header items in the trace stream and to group a set of payload items together into a contiguous sequence of payload items in the trace stream.

In at least some embodiments there is provided an apparatus for generating a trace stream indicative of data processing activities of a data processing apparatus, the apparatus comprising: means for receiving information related to the data processing activities of a data processing apparatus; means for generating header items and payload items from the received information, wherein each payload item is associated with a header item and the header item provides interpretation information for the payload item; and means for grouping a set of header items together into a contiguous sequence of header items in the trace stream and to group a set of payload items together into a contiguous sequence of payload items in the trace stream.

In at least some embodiments there is provided an apparatus for receiving a trace stream indicative of data processing activities of a data processing apparatus, the apparatus comprising: trace stream reception circuitry to receive the trace stream, wherein the trace stream comprises header items and payload items; and trace stream processing circuitry to identify a contiguous sequence of header items and a contiguous sequence of payload items in the trace stream, and to identify a header item for each payload item and process each payload item in dependence on the header item.

In at least some embodiments there is provided a method of receiving a trace stream indicative of data processing activities of a data processing apparatus, comprising the steps of: receiving the trace stream, wherein the trace stream comprises header items and payload items; identifying a contiguous sequence of header items and a contiguous sequence of payload items in the trace stream; identifying a header item for each payload item; and processing each payload item in dependence on the header item.

In at least some embodiments there is provided an apparatus for receiving a trace stream indicative of data processing activities of a data processing apparatus, the apparatus comprising: means for receiving the trace stream, wherein the trace stream comprises header items and payload items; means for identifying a contiguous sequence of header items and a contiguous sequence of payload items in the trace stream; means for identifying a header item for each payload item; and means for processing each payload item in dependence on the header item.

FIG. 1 schematically illustrates a data processing system 10 in one embodiment. This data processing system 10 comprises a system-on-chip 12, a cache 14 and a memory 16. The system-on-chip 12 itself comprises a processor core 18 and a trace unit 20. The trace unit 20 is provided to receive indications of the data processing activities of the processor core 18 and to generate a trace stream which is indicative of the data processing activities, this trace stream being output off-chip for temporary storage in the cache 14 and/or the memory 16. The processor core 18 comprises an execution pipeline 22 by means of which a sequence of data processing instructions retrieved from cache 14 or memory 16 are executed in a manner in which one of ordinary skill in the art will be familiar. The result of the data processing activity resulting from the execution of those data processing instructions is then, where necessary, written back to the cache 14 and/or the memory 16. The trace unit 20 receives indications of the activity of one or more of the stages (of which six are schematically illustrated in FIG. 1) of the execution pipeline 22 at an interface 24 which then passes these indications on to the trace stream generation circuitry 26. The trace stream generation circuitry 26 is configured (i.e. has a structure which enables it) to generate the required trace stream on the basis of those received indications. The trace stream generation circuitry 26 comprises compression circuitry 28, buffer circuitry 30 and reorder circuitry 32, further detail of which will be discussed below with reference to the following figures. As also schematically illustrated in FIG. 1, the cache memory 14 has a structure which uses a 64-byte cache line length, whilst the memory 16 has a structure in which data items are most efficiently accessed with 8-byte alignment, i.e. when data items having a length of 8 bytes are written to and retrieved from the memory 16. Data items may also be accessed in the memory 16 using other lengths, but the 8-byte length is known to give the most efficient access to this example memory. Accordingly the most efficient overall usage of the memory hierarchy is made when data items of 8-byte length are accessed in the memory 16 and groups of 8 such data items are cached in each cache line of the cache 14.

FIG. 2A shows the format which the trace stream takes in one embodiment.

The hatched items are header items, whilst the unhatched items are payload items. Thus, as can be seen in the figure, the structure of the trace stream is such that a contiguous sequence of header items (a header sequence) is generated, followed by a contiguous sequence of payload items (a payload sequence). The contiguous sequence of header items is thus a sequence of packet headers which can be any sequence, including packet headers, but only comprises headers. The data follows immediately after the sequence in the order of the headers. The definitions of the header items correspond to those shown in FIGS. 3A and 3B—see further discussion below. Note that in the example shown in FIG. 2A there are 16 header items (bytes 0-15 inclusive) which make up the contiguous sequence of header items and 9 payload items (bytes 16-53 inclusive) which make up the contiguous sequence of payload items. Each payload item is associated with one of the header items, where that header item provides the recipient of the trace stream with information relating to the payload item, in particular indicating what type of payload item it is, and therefore allowing the recipient of the trace stream to interpret that payload item of the trace stream. The additional header items, which are not associated with a specific payload item, provide other information relating to the trace stream. For example, the contiguous sequence of header items begins with a header item 0x02 and ends with a header item 0x03. These particular encodings of these header items are used to indicate the beginning and the end of the contiguous sequence of header items respectively. The contiguous sequence of header items also includes two header items 0x00, which are "dummy" header items, which have no meaning with respect to the activities of the data processing apparatus, but are used by the trace unit to pad the contiguous sequence of header items to a particular length. As can be seen from FIG. 2A the relevant length in this example is 8 bytes, which has been selected to correspond to the configuration of a memory in which this trace stream will be stored, which (as in the memory 16 of the example shown FIG. 1) has a storage configuration which is 8-byte aligned. Similarly, note that the contiguous sequence of payload items also concludes with two further dummy header items 0x00, which serve the same purpose, namely to ensure that, following the contiguous sequence of payload items, the combined sequence of header and payload items has the same 8-byte alignment. Thus once the recipient of the trace stream has identified the last payload item (0x67 at byte 53), it can further recognise that no information about the data processing activities of the data processing apparatus is conveyed by the next two bytes (the dummy header items 0x00 at bytes 54 and 55), and the next valid header sequence will thus be recognised to start at byte 56 (not shown), aligned with this 8-byte boundary.

Figure 3A:
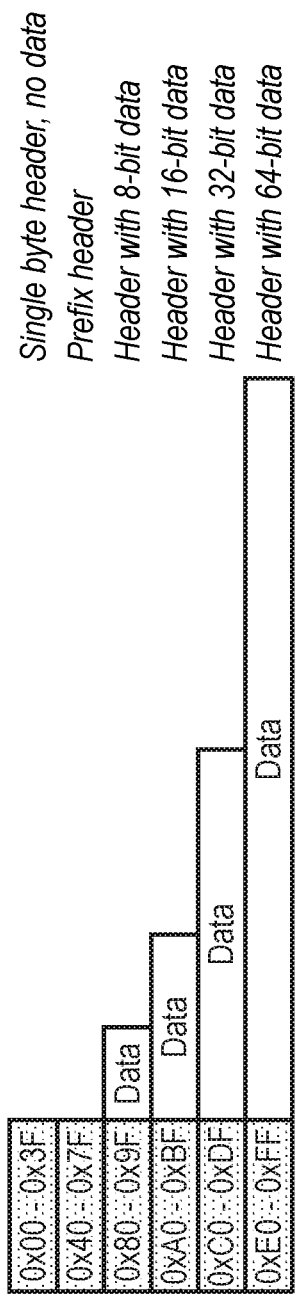
FIGS. 3A and 3B show example definitions of header items, and payload items where applicable, in some embodiments.

Referring to both FIG. 2A and FIG. 3A, for the example shown in FIG. 2A the first and last header items 0x02 and 0x03 bracket the "real" sequence of header items, i.e. the header items 0xE1 at byte 1 through to 0x07 at byte 12 (inclusive), and the two following dummy header items 0x00. Cross-referencing to FIG. 3A, this sequence of header items is thus:

0xE1 (header with 8-byte payload item, i.e. Timestamp)
0xE9 (header with 8-byte payload item, i.e. VA #1)
0xEA (header with 8-byte payload item, i.e. VA #2)
0xC4 (header with 4-byte payload item, i.e. CONTEXTIDR_EL1)
0xC5 (header with 4-byte payload item, i.e. CONTEXTIDR_EL2)
0x41 (prefix header, i.e. modifies the meaning of the following 0x09)
0x09 (header with no corresponding payload item)
0xAC (header with 2-byte payload item, i.e. Count #0)
0xAD (header with 2-byte payload item, i.e. Count #1)
0x80 (header with 1-byte payload item, i.e. Source ID)
0x82 (header with 1-byte payload item, i.e. 0x67)
0x07 (header with no corresponding payload item)
0x00 (header with no corresponding payload item)
0x00 (header with no corresponding payload item)

Note also with respect to FIG. 2A that the structure of the payload sequence is such that the longest payload items (i.e. Timestamp, VA#1 and VA#2) appear first in the payload sequence, whilst smaller payload items follow. The trace stream generation circuitry can be configured (i.e. have a configuration) which reorders the header item/payload item pairs, so that those with the longest payload items appear first in the sequences. This has the effect that a natural alignment of the payload sequence then results (and of the header sequence, of which the header items will typically be considerably shorter than the payload items), since any shorter payload items, or sets of payload items, can be padded to the length of the longest payload item. Naturally the user configuring the operation of the trace stream generation circuitry must have knowledge of what the length of the longest payload item can be, to determine if this matches the byte-alignment sought to provide efficient memory access as described above. In the example of FIG. 2A the Timestamp and virtual address (VA) payload items have been defined to be of 8-byte length to match the known memory access byte length configuration.

FIGS. 2B, 2C and 2D show some examples of variations on the format which the contiguous sequence of header items shown in FIG. 2A may take, in particular related to the use of header items that may indicate the beginning, length and end of the sequence, with the same payload sequence as shown in FIG. 2A. As such, the same twelve "real" header items (i.e. the header items 0xE1 at byte 1 through to 0x07 at byte 12 (inclusive) in FIG. 2A), are included in the sequences of FIGS. 2B-2D, although these have been omitted for clarity of the discussion of the beginning, length and end indicators.

As can be seen in FIG. 2B the same group start header item as in FIG. 2A (0x02) is used to indicate the beginning of the header sequence, but it is the last two header items in the header sequence which are the dummy header item 0x00 (and no explicit group end header item is used. The recipient of the trace stream knows the length of the header sequence in this example embodiment from the second header item in the sequence 0x0E, which immediately follows the group start header item 0x02 and provides additional information with respect to that group start header item, namely the length of the contiguous sequence of header items which follows. Thus, in the example shown in FIG. 2B, the semantic meaning of the second header item 0x0E (14) is that the contiguous sequence of payload items which follows is fourteen bytes long, i.e. the twelve "real" header items and the two dummy header items shown. Alternatively, as in the example shown in FIG. 2C, the group start header item itself may have an encoding which is indicative of the length of the contiguous sequence of header items, i.e. the encoding indicates that this header item is not only a group start header item, but also what the length of the contiguous sequence of header items is. Thus, in the example shown where the group start header item is 0x0F (15), the information provided is that the contiguous sequence of header items which follows is fifteen bytes long, i.e. the twelve "real" header items and the three dummy header items shown.

Whilst in the example of FIG. 2A separate encodings are used for the group start header item and the group end header item, i.e. 0x02 and 0x03, the same encoding may be used for both as is shown in FIG. 2D, using 0x02 for this purpose.

Figure 3B:
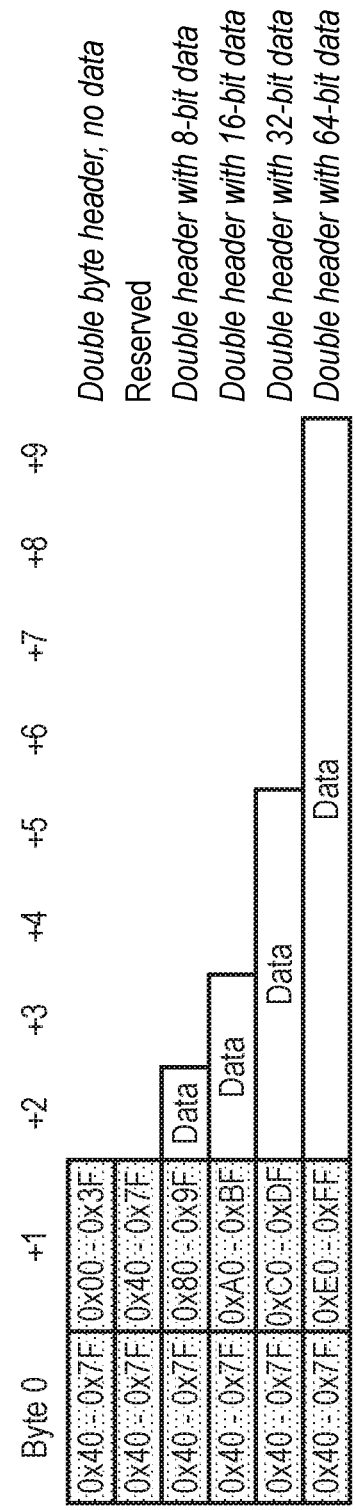

FIGS. 3A and 3B show example header item encodings. FIG. 3A shows six groups of header encodings for values between 0x00 and 0xFF, and an overview of their corresponding meanings. Note that the encodings between 0x00 and 0x7F are not associated with a payload (data) item, whilst the encodings between 0x80 and 0xFF are associated with payload items having 8-bit, 16-bit, 32-bit and 64-bit lengths respectively. Further, note in particular that the encodings between 0x40 and 0x7F represent "prefix headers" which are used to modify the meaning of other headers. This is shown in FIG. 3B, where one of these prefix headers is used preceding another header item, which in the example of FIG. 3B is the same set of six groups of header items shown in FIG. 3A, and their associated meanings.

FIG. 4A shows another example format of the trace stream generated by trace stream generation circuitry of a trace unit according to the present techniques. In this example the content of the illustrated portion of the trace stream takes a predetermined format, which has been defined to be both 8-byte aligned (i.e. has an 8-byte width as shown in the figure) and also that the portion of the trace stream shown has a total length (i.e. header items and payload items combined) of 64 bytes. The 8-byte width has been defined to correspond to the memory in which this structure will be saved (see the example memory 16 in FIG. 1), whilst the 64 byte length has been defined to correspond to the cache line length in a cache in which this structure will be temporarily stored (see the example cache 14 shown in FIG. 1). In the example of FIG. 4A, the first header sequence (shaded) is defined by the group start header item 0x02, which in this example is interpreted to indicate only the beginning of the header sequence, since it is known (according to the predetermined format) that the header sequence will have a 8-byte length. The set of header items which follow are thus known by the recipient of the trace stream to be valid header items. A second header sequence begins at byte 40 (as indicated by the second incidence of the header item 0x02) and also has a 8-byte length. Of the seven header items which follow, 5 header items are used to convey information about the data processing activities of the data processing apparatus being monitored (0xB1 at byte 41 to 0x08 at byte 45, of which the first four correspond to the following payload items, whilst the fifth (0x08) does not have a corresponding payload item). The header item 0x45 is used as an alignment header item, indicating to the recipient of the trace stream that after the last payload item in the sequence corresponding to a header item which precedes the alignment header item (i.e. Source ID, corresponding to the header item 0xA0 in the example shown in FIG. 4A), the next valid header item is to be found after the next 64 byte boundary. The header item 0x45 is then followed by a dummy header item 0x00, to align this header sequence with the next 8-byte boundary. Accordingly, once the Source ID payload item at bytes 54 and 55 has been identified, it is known that the following items up to byte 64 in this frame are of no meaning with respect to the data processing activities of the data processing apparatus being traced. For this reason, the items shown in the last row of FIG. 4A (between bytes 56 and 63) are marked "UNKNOWN". These slots could be explicitly filled with dummy header items or dummy payload items, although this is not necessary given the information provided by the alignment header item and the content of these slots may take any form, saving the trace stream generation circuitry the processing required to fill them.

Figure 4B:
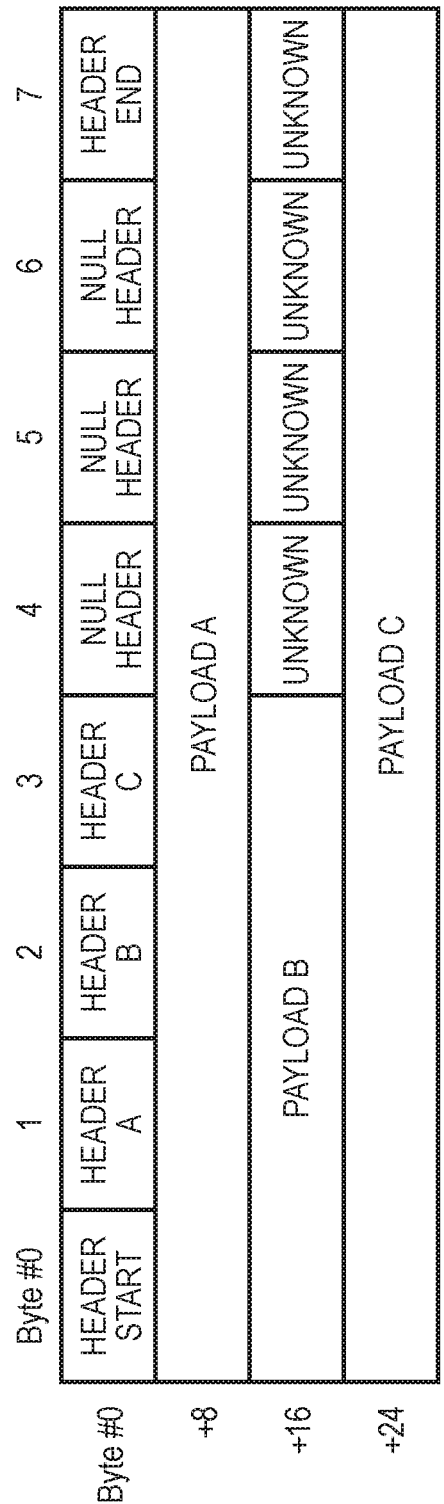
FIG. 4B shows an example portion of the trace stream in some embodiments, in which the contiguous sequence of payload items is generated so that each payload item begins on a predetermined boundary.

FIG. 4B shows another example format of the trace stream generated by trace stream generation circuitry of a trace unit according to the present techniques. In this example the content of the illustrated portion of the trace stream takes a predetermined format, which has been defined to be 8-byte aligned (i.e. has an 8-byte width as shown in the figure). This example shows the alignment of the payload items with a predetermined boundary, here an 8-byte boundary. Since header B tells the recipient the length of payload B, the recipient then also knows that the data between the end of payload B and the beginning of the payload C is meaningless, since the payload items are known to be 8-byte aligned and payload B is known to be 32 bits (4-byte) long. Accordingly the items shown at bytes 20-23 inclusive in FIG. 4B are marked "UNKNOWN" since the trace stream generator is free to put any data here, as it will be ignored by the recipient. Whilst it might be possible to reorder the payload items instead, situations may arise in which it is not desirable to re-order the packets (e.g. the order of the packets is important, or there is some hardware advantage in avoiding the re-ordering items) and the technique illustrated in FIG. 4B can be used in such situations.

Figure 5:
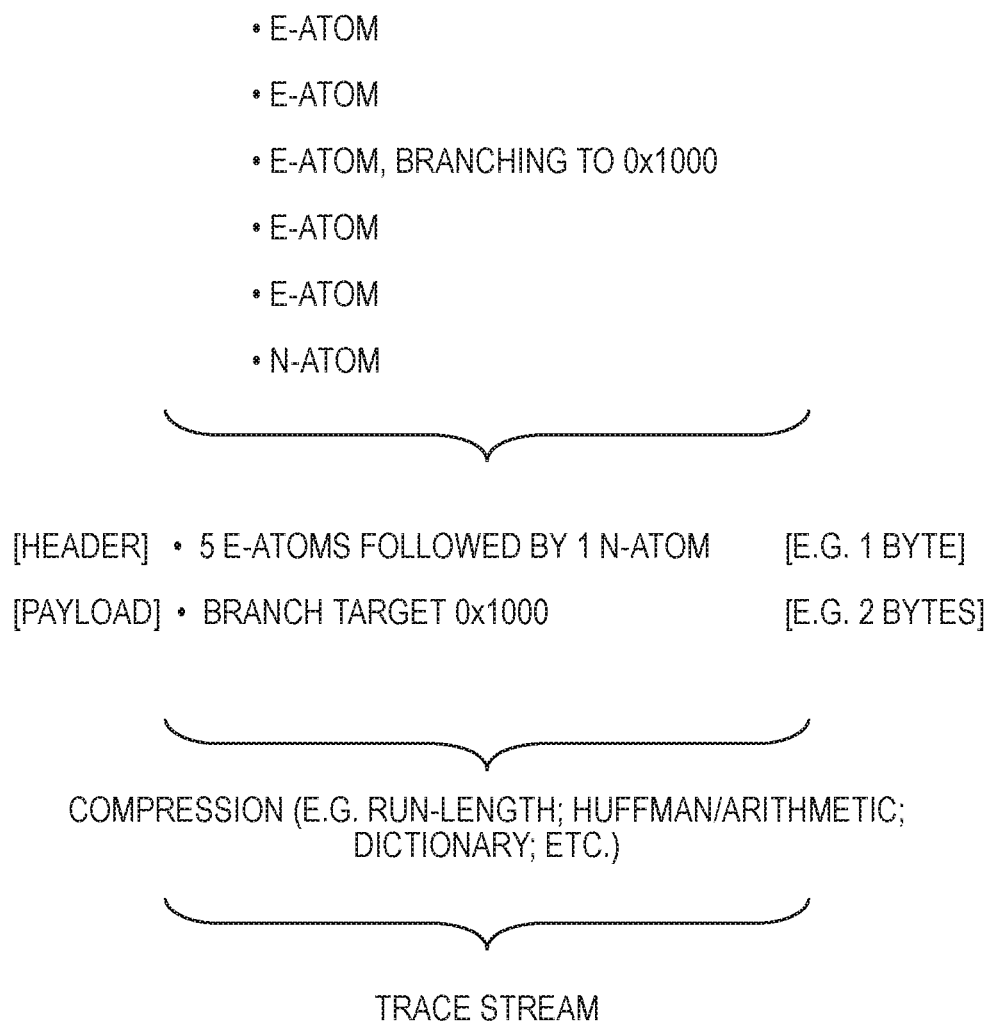
FIG. 5 illustrates the usage of the trace stream in one embodiment to indicate branch points in the data processing activities of a data processing apparatus.

The header items and payload items which the trace stream generation circuitry generates may have a variety of meanings. FIG. 5 relates to an example in which the data processing apparatus executes a sequence of data processing instructions which include various branches, i.e. instructions within the sequence which may cause the next instruction executed to be the next sequential instruction, or may be an instruction at any other point in the sequence of instructions depending on how that branch is configured. In FIG. 5, a taken branch is represented in the trace stream by an "E-atom", whilst a branch which is not taken is represented by an "N-atom". Each of these has a minimum length (e.g. 1 byte) according to the encoding used. Content of the trace stream relating to instructions between these branch points is not generated, since it can be inferred that these non-branching instructions were simply executed in sequence. Note also that the third E-atom is associated with the further information that the target memory address at which the instruction to which the branch was taken was 0x1000. This information is provided because this target memory address in this example cannot be known simply from the fact that the branch was taken, for example because the target memory address itself is the result of a further operation, such as a load. Nevertheless, despite the fact that this third trace item must indicate the branch target as well as the fact that the branch was taken, the present techniques recognise that reordering of the information in the upper part of FIG. 5 is not only possible but also of benefit. Thus, as also shown in FIG. 5, two packets in the trace stream can represent this information. The first indicates that 5 E-atoms are followed by one N-atom, whilst the second indicates the branch target address 0x1000. According to the present techniques the first of these may be considered to be a header item, whilst the second a payload item. This rearranging has the particular consequence that the header sequence can then be efficiently represented, for example using only one byte where the definition of the header items comprises a dictionary in which all such permutations of E-atoms and N-atoms are defined. Conversely, the explicit definition of the branch target 0x1000 requires (without encoding) two bytes. Thus, the reordering of the header items and payload items according to the present techniques already provides an efficient representation of the information to be traced, for example being representable in three bytes, rather than in, say, four bytes to represent the information in the upper part of FIG. 5—this being an indicator of "3 E atoms" in one byte, the branch target in two bytes and an indicator of "2 E atoms and 1 N atom" in one byte. This results from, firstly, the reordering of the information provided, and secondly from the packing of the atoms into a single byte by the defined indicators (i.e. in this example "3 E atoms" and "2 E atoms and 1 N atom"). However, thus rearranged, further compression of the information may also be possible, for example using run length, Huffman, arithmetic, dictionary or other compression techniques known to one of ordinary skill in the art, by virtue of the fact that the sequence of header items takes one of a relatively limited number of possible formats, which lends itself well to compression. The payload item, which in principle can take any value in the available two bytes, may also allow a certain degree of compression to be achieved, depending on the particular format that the payload data takes, and the frequency with which particular payload items repeat themselves in the trace stream. Thus compressed, the contiguous sequence of header items and contiguous sequence of payload items can then be output.

Figure 6:
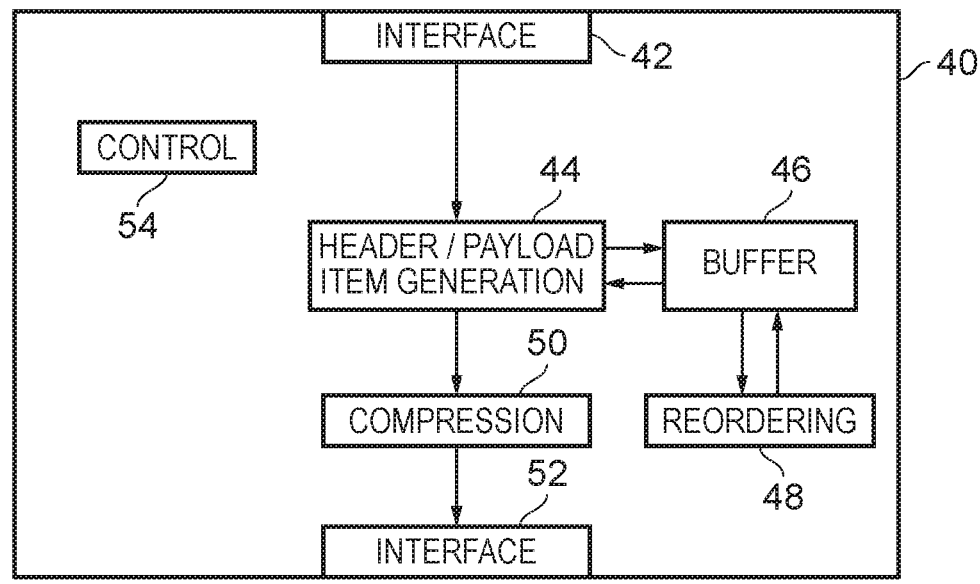
FIG. 6 schematically illustrates a trace unit in one embodiment.

FIG. 6 schematically illustrates the configuration of a trace unit 40 in one embodiment which supports these techniques. The trace unit 40 comprises an interface 42 via which information indicative of the data processing activities of the data processing apparatus to be traced is received, a header/payload item generation unit (i.e. trace stream generation circuitry) 44, a buffer 46, a reordering unit 48, a compression unit 50, a further interface 52 and a control unit 54. In this example embodiment each of these components is embodied as dedicated circuitry with a configuration to provide the described function. The control unit 54 is in overall control of the other components and in particular to configure the format in which the trace stream is produced. On the basis of the information it receives, the header/payload item generation unit 44 generates corresponding header items and payload items, which are buffered in the buffer 46. Once a sufficient number of these trace items have been buffered, the reordering unit 48 accesses them and reorders them such that the header items may be output as a contiguous sequence of header items and the payload items may be output as a contiguous sequence of payload items. Moreover, where it is required that the first payload item in the contiguous sequence of payload items is that having the greatest length, the reordering unit 48 puts this (or these) payload item(s) first in the sequence. Thus generated and rearranged, the contiguous sequences of header items and payload items are passed to the compression unit 50 which applies a predetermined compression algorithm in order to seek to reduce the size of data further. The output of compression unit 50 is passed to the interface unit 52 from where the trace stream is output from the trace unit 40, for example to be stored in memory, but may also be directly passed to the recipient of the trace stream seeking to interpret the trace stream to understand the data processing activities of the data processing apparatus.

Figure 7:
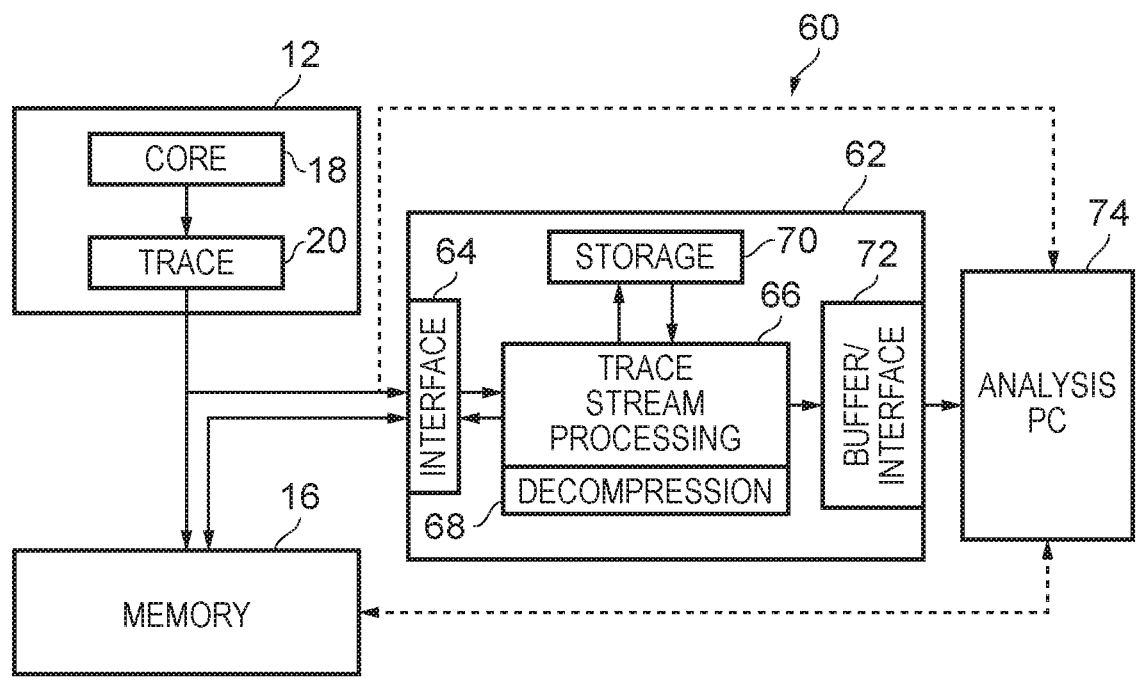
FIG. 7 schematically illustrates a data processing system in one embodiment.

FIG. 7 schematically illustrates a data processing system 60 which comprises the data processing apparatus 12 and memory 16 which were described with reference to FIG. 1. These components are further coupled to a trace stream receiver 62 which is provided to allow interpretation of the trace stream and thus understanding of the data processing activities of the data processing apparatus 12. The trace stream receiver 62 has an interface 64 at which the trace stream is received, this trace stream either being received directly from the data processing apparatus 12 or being retrieved from the memory 16. The trace stream is passed from the interface 64 to the trace stream processing circuitry 66, which also has associated decompression circuitry 68 to decompress the trace stream if it has been compressed by a compression unit such as compression unit 50 shown in FIG. 6. The trace stream processing circuitry 66 identifies the contiguous sequence of header items and the contiguous sequence of payload items on the basis of the encodings of the header items as described above and then interprets the associated payload items accordingly. In performing this identification and processing, the trace stream processing circuitry 66 makes use of the local storage 70, and once the processing is complete the trace stream processing circuitry 66 can pass the results via interface 64 to be stored in memory 16 or via buffer/interface 72 to be passed to an analysis computer 74, where the results may for example be further processed and/or graphically represented for the user to study. In an alternative, the analysis PC 74 may receive the trace stream directly from the data processing apparatus 12 (dashed line) or may retrieve a stored trace stream from the memory 16 (dashed line). In this alternative, the analysis PC 74 has a configuration to perform the role described above of the trace stream receiver 62, i.e. to receive and possibly decompress the trace stream, to identify the contiguous sequence of header items and the contiguous sequence of payload items in the trace stream, and to interpret the payload items on the basis of their associated header items. An example analysis PC is described below with reference to FIG. 10.

Figure 8A:
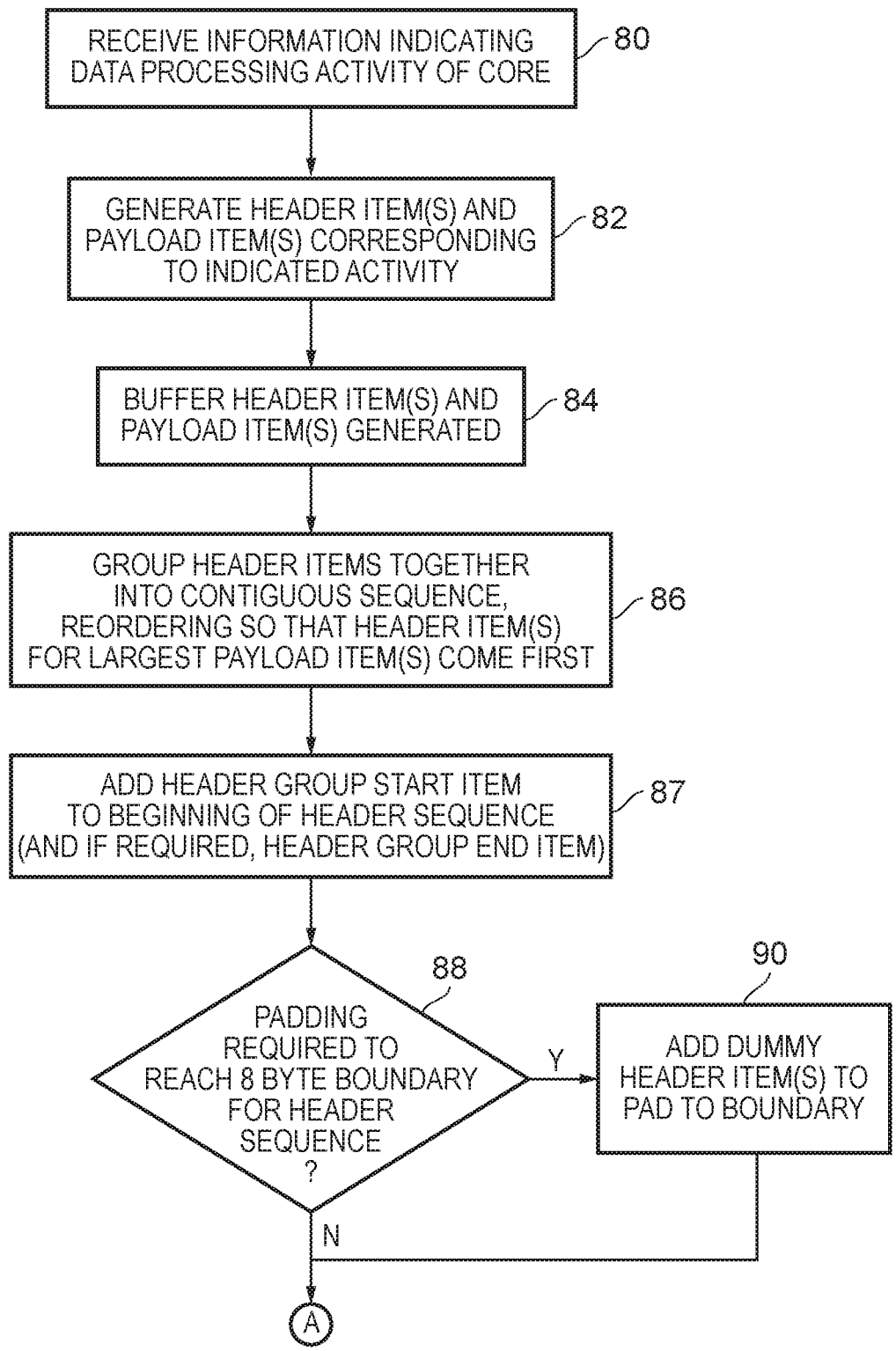
FIGS. 8A and 8B show a sequence of steps which are carried out when tracing the data processing activities of a data processing apparatus in one embodiment.
Figure 8B:
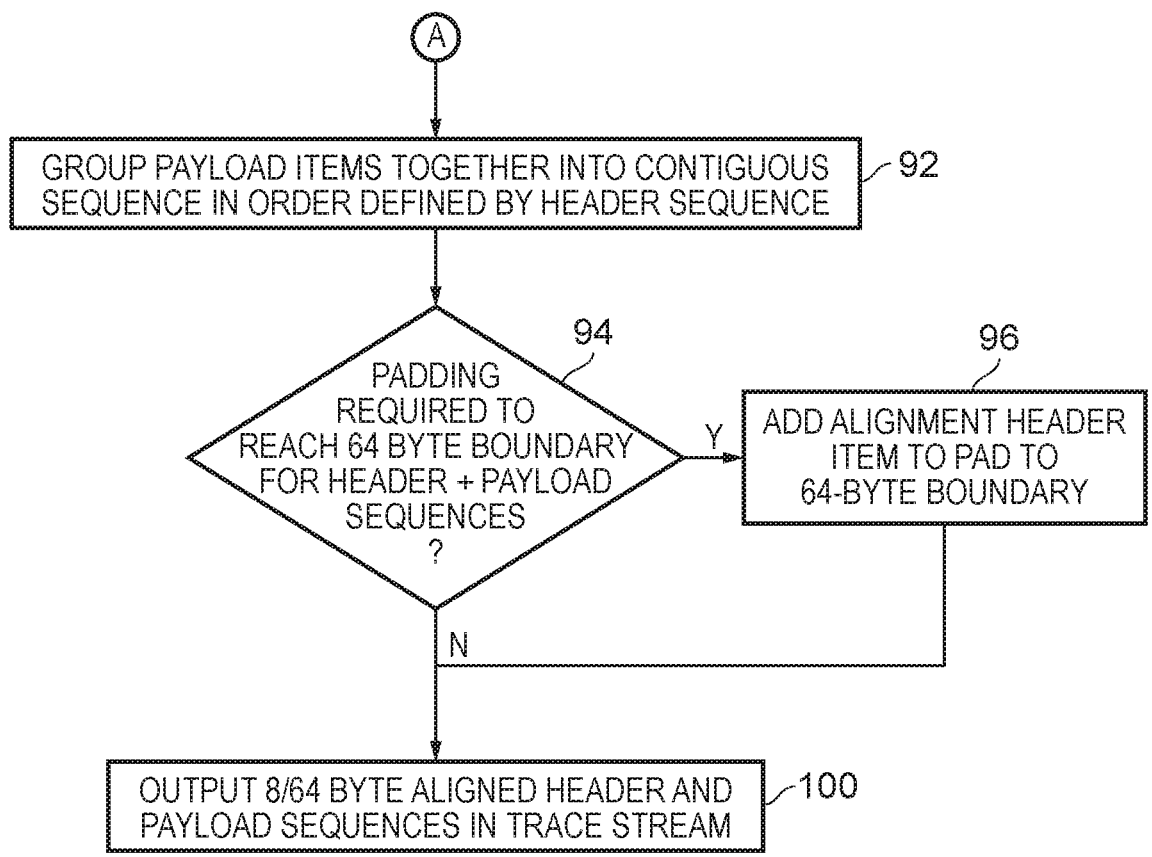

FIG. 8 (as represented by FIGS. 8A and 8B) shows a sequence of steps which are taken in one embodiment when generating a trace stream according to the present techniques. The illustrated flow begins at step 80 (in FIG. 8A) where the trace unit receives information indicative of the data processing activity of the processor core. On the basis of this received information, at step 82, the trace unit generates at least one header item and at least one payload item corresponding to the indicated activity. These are then buffered (at step 84) whilst further header items and payload items are generated. Then, at step 86, when sufficient header and payload items have been generated, these are grouped into a contiguous sequence, and reordered so that the header item corresponding to the largest payload item comes first. At step 87, a header group start item is added to the beginning of the header sequence (and if required a header group end item in dependence on the predefined meaning of the header group start item). It is then determined at step 88 if the contiguous sequence of header items thus produced, and allowing for the addition of a header group start item (and if being used a header group end item), will align with an 8-byte boundary. If it does not, then padding is required to reach this 8-byte boundary and this is done at step 90, where at least one dummy header item is added to the contiguous sequence to extend it to be 8-byte aligned. The flow then proceeds to step 92 (in FIG. 8B) where the payload items are grouped together into a contiguous sequence in the order defined by the header sequence. It is then determined at step 94 if padding is required for the combined contiguous sequences of header items and payload items to reach a 64-byte boundary. If it does then the flow proceeds via step 96 where an alignment header item is added to indicate to the recipient of the trace stream that after the last payload item with an associated header item the next valid header item (i.e. the first header item in the next contiguous sequence of header items) is to be found after the next 64-byte boundary. Thus, a contiguous sequence of header items and a contiguous sequence of payload items has then been generated of which each sequence is 8-byte aligned and together the sequences are 64-byte aligned. The flow then proceeds to step 100 where this frame of the trace stream is then output, in its 8-byte/64-byte aligned format.

Figure 9:
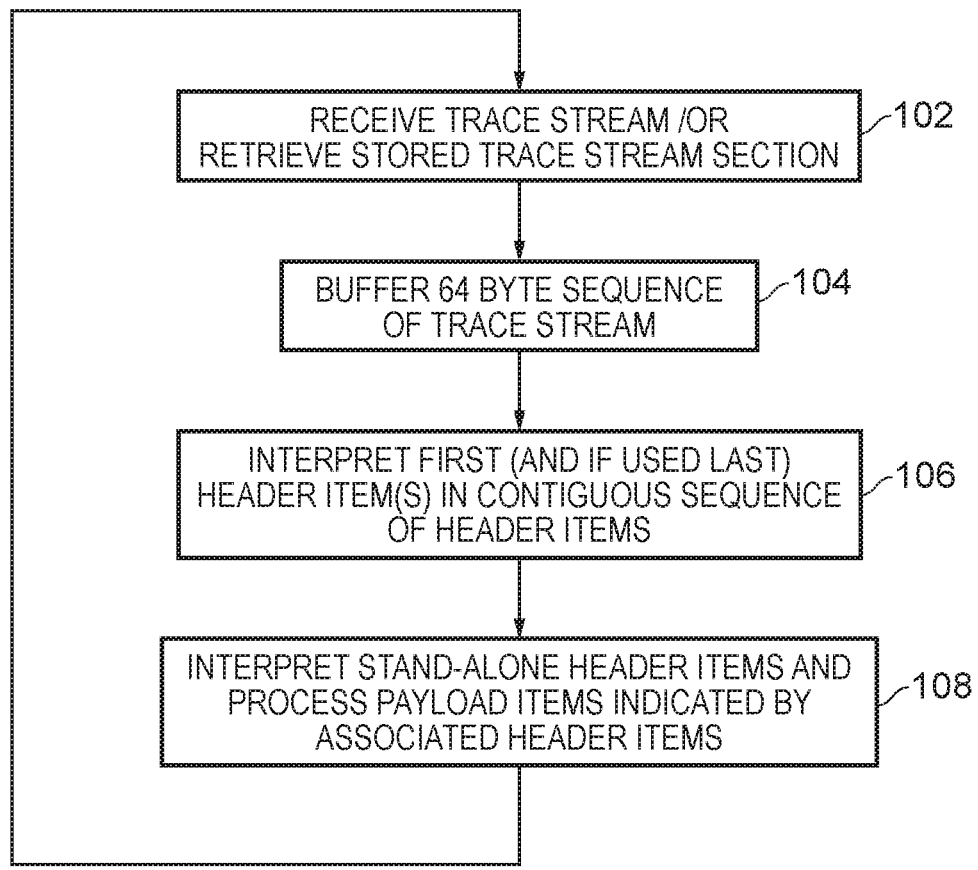
FIG. 9 shows a sequence of steps which are taken when interpreting a received trace stream in one embodiment.

FIG. 9 shows a sequence of steps which are taken by a trace stream receiver when receiving a trace stream and seeking to interpret it. The flow can be considered to begin at step 102 where the trace stream receiver receives the trace stream (either directly from the generator of the trace stream or by retrieving it from memory). Then at step 104 a 64-byte sequence of the trace stream is buffered for analysis and at step 106 the first header item is interpreted to identify the beginning of the contiguous sequence of header items (and, if used, the last header item to identify the end of the header sequence). On the basis of this identification, at step 108, the "stand alone" header items, i.e. those that are not used to define the contiguous sequence of header items itself (such as header groups start and header group end items) are identified and on the basis of these header items, the corresponding payload items are processed and interpreted. The results of this interpretation are then either stored for further analysis or passed to a further recipient.

Figure 10:
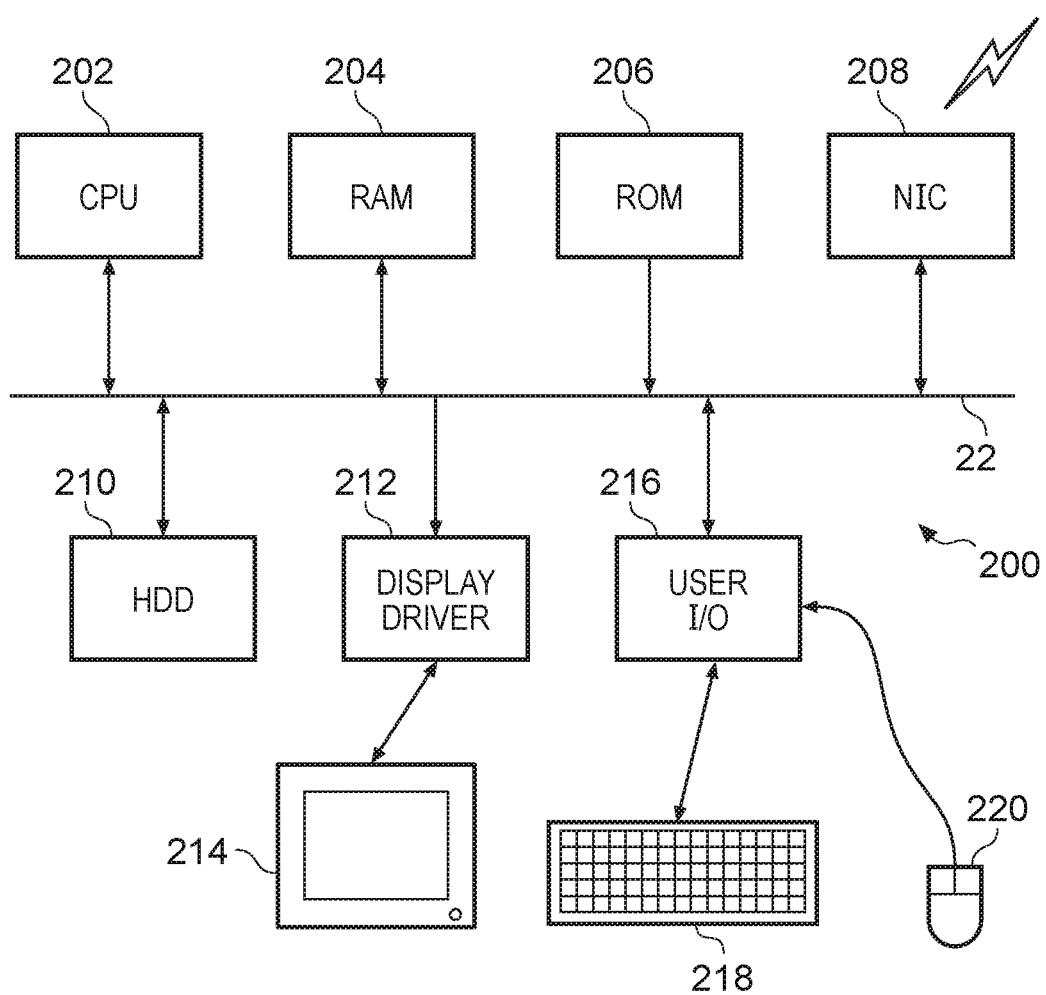
FIG. 10 schematically illustrates a general purpose computing device.

FIG. 10 schematically illustrates a general purpose computing device 200 of the type that may be used to implement the above mentioned further analysis. The general purpose computing device 200 includes a central processing unit 202, a random access memory 204 and a read only memory 206, connected together via bus 222. It also further comprises a network interface card 208, a hard disk drive 210, a display driver 212 and monitor 214 and a user input/output circuit 216 with a keyboard 218 and mouse 220 all connected via the common bus 222. In operation, such as when forming part of the analysis PC 74 of FIG. 7, the central processing unit 202 will execute computer program instructions that may for example be stored in the random access memory 204 and/or the read only memory 206. Program instructions could be additionally retrieved from the hard disk drive 210 or dynamically downloaded via the network interface card 208. The results of the processing performed may be displayed to a user or an engineer via a connected display driver 212 and monitor 214. User inputs for controlling the operation of the general purpose computing device 200 may be received via a connected user input output circuit 216 from the keyboard 218 or the mouse 220. It will be appreciated that the computer program could be written in a variety of different computer languages. The computer program may be stored locally on a recording medium or dynamically downloaded to the general purpose computing device 200. When operating under control of an appropriate computer program, the general purpose computing device 200 can perform the above described trace analysis techniques and can be considered to form an apparatus for performing the above described trace analysis techniques. The architecture of the general purpose computing device 200 could vary considerably and FIG. 10 is only one example.

Thus in summary, an apparatus for generating a trace stream, a method for generating a trace stream, an apparatus for receiving a trace stream and a method of receiving a trace stream are provided. Header items and payload items in the trace stream are respectively grouped together into a contiguous sequence of header items and a contiguous sequence of payload items. This can for example facilitate the production of a trace stream in which the trace stream is aligned to a predetermined length (e.g. corresponding to an alignment of a memory in which the trace stream is to be stored) thus facilitating its interpretation.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus for generating a trace stream indicative of data processing activities of a data processing apparatus, the apparatus comprising:
   trace stream generation circuitry to generate the trace stream, wherein the trace stream comprises header items and payload items, wherein each payload item is associated with a header item and the header item provides interpretation information for the payload item,
   and the trace stream generation circuitry is capable of grouping a set of header items together into a contiguous sequence of header items in the trace stream and grouping a set of payload items together into a contiguous sequence of payload items in the trace stream,
   wherein the trace stream generation circuitry is capable of generating the trace stream comprising a group start header item as a first header item in the contiguous sequence of header items, the group start header item having an encoding indicating the start of the contiguous sequence of header items comprising at least two header items providing interpretation information for associated payload items.

2. The apparatus as claimed in claim 1, wherein an encoding of the group start header item is indicative of the number of header items in the contiguous sequence of header items.

3. The apparatus as claimed in claim 1, wherein the trace stream generation circuitry is capable of generating the trace stream comprising a length indication header item adjacent to the group start header item, wherein the length indication header item is indicative of the number of header items in the contiguous sequence of header items.

4. The apparatus as claimed in claim 1, wherein the trace stream generation circuitry is capable of generating the trace stream comprising a group end header item as a last header item in the contiguous sequence of header items.

5. The apparatus as claimed in claim 4, wherein the group start header item and the group end header item are identical.

6. The apparatus as claimed in claim 1, wherein the trace stream generation circuitry is capable of adding at least one dummy header item to the contiguous sequence of header items, such that the contiguous sequence of header items has a length which is a multiple of a predetermined length.

7. The apparatus as claimed in claim 1, wherein the trace stream generation circuitry is capable of adding at least one dummy payload item to the contiguous sequence of payload items, such that the contiguous sequence of payload items has a length which is a multiple of a predetermined length.

8. The apparatus as claimed in claim 1, wherein the trace stream generation circuitry is capable of generating the contiguous sequence of payload items comprising at least one unspecified portion, such that the contiguous sequence of payload items has a length which is a multiple of a predetermined length.

9. The apparatus as claimed in claim 1, wherein the trace stream generation circuitry is capable of adding at least one dummy payload item to the contiguous sequence of payload items or generating the contiguous sequence of payload items comprising at least one unspecified payload item, such that the contiguous sequence of header items and the contiguous sequence of payload items together have a predetermined length.

10. The apparatus as claimed in claim 1, wherein the trace stream generation circuitry is capable of generating the trace stream comprising an alignment header item, wherein the alignment header item follows a last header item in the contiguous sequence of header items which provides interpretation information for at least one referenced payload item in the contiguous sequence of payload items, and wherein the alignment header item is indicative that header items or payload items which follow the at least one referenced payload item up to a length of header items and payload items together which is a multiple of a predetermined length are not indicative of the data processing activities of the data processing apparatus.

11. The apparatus as claimed in claim 1, wherein the trace stream generation circuitry further comprises buffer circuitry and reorder circuitry,
the buffer circuitry to buffer header items and payload items, and
the reorder circuitry to reorder header items and payload items buffered in the buffer circuitry for inclusion in the trace stream.

12. The apparatus as claimed in claim 11, wherein the reorder circuitry is capable of reordering the header items and payload items such that a largest payload item of the contiguous sequence of payload items is first in the contiguous sequence of payload items.

13. The apparatus as claimed in claim 1, wherein the trace stream generation circuitry is capable of including a prefix header item in the contiguous sequence of header items, wherein presence of the prefix header item in the contiguous sequence of header items modifies a meaning of the header item which follows the prefix header item.

14. The apparatus as claimed in claim 1, wherein the trace stream generation circuitry further comprises compression circuitry for applying a compression to the contiguous sequence of header items in the trace stream.

15. The apparatus as claimed in claim 14, wherein the compression circuitry is further capable of applying the compression to the contiguous sequence of payload items in the trace stream.

16. The apparatus as claimed in claim 1, wherein the header items are branch indicators and each branch indicator indicates whether the data processing apparatus has taken a branch when performing the data processing activities.

17. The apparatus as claimed in claim 16, wherein at least one payload item represents a memory address at which an instruction is stored, wherein the data processing apparatus has taken the branch to the instruction when performing the data processing activities.

18. The apparatus as claimed in claim 1, wherein the trace stream generation circuitry is capable of generating the contiguous sequence of payload items wherein a starting position of at least one payload item is delayed in the contiguous sequence of payload items so that the starting position of the at least one payload item is aligned with a multiple of a predetermined offset from a start of the contiguous sequence of payload items.

19. The apparatus as claimed in claim 18, wherein the trace stream generation circuitry is capable of delaying the starting position of the at least one payload item in the contiguous sequence of payload items by adding at least one unspecified portion prior to the at least one payload item.

20. A data processing system comprising an apparatus as claimed in claim 1.

21. A data processing system comprising an apparatus as claimed in claim 6, comprising a data storage device having a configuration in which access to stored data is made in units of the predetermined length.

22. A method of generating a trace stream indicative of data processing activities of a data processing apparatus, the method comprising the steps of:

receiving information related to the data processing activities of a data processing apparatus;
generating header items and payload items from the received information, wherein each payload item is associated with a header item and the header item provides interpretation information for the payload item; and
grouping a set of header items together into a contiguous sequence of header items in the trace stream and to group a set of payload items together into a contiguous sequence of payload items in the trace stream,
wherein the trace stream comprises a group start header item as a first header item in the contiguous sequence of header items, the group start header item having an encoding indicating the start of the contiguous sequence of header items comprising at least two header items providing interpretation information for associated payload items.

23. Apparatus for receiving a trace stream indicative of data processing activities of a data processing apparatus, the apparatus comprising:
trace stream reception circuitry to receive the trace stream, wherein the trace stream comprises header items and payload items; and
trace stream processing circuitry to identify a contiguous sequence of header items and a contiguous sequence of payload items in the trace stream, the trace stream comprising a group start header item as a first header item in the contiguous sequence of header items, the group start header item having an encoding indicating the start of the contiguous sequence of header items comprising at least two header items providing interpretation information for associated payload items;
and to identify a header item for each payload item and process each payload item in dependence on the header item.

24. A method of receiving a trace stream indicative of data processing activities of a data processing apparatus, comprising the steps of:
receiving the trace stream, wherein the trace stream comprises header items and payload items;
identifying a contiguous sequence of header items and a contiguous sequence of payload items in the trace stream;
identifying a header item for each payload item; and
processing each payload item in dependence on the header item,
wherein the trace stream comprises a group start header item as a first header item in the contiguous sequence of header items, the group start header item having an encoding indicating the start of the contiguous sequence of header items comprising at least two header items providing interpretation information for associated payload items.

25. Apparatus for generating a trace stream indicative of data processing activities of a data processing apparatus, the apparatus comprising:
trace stream generation circuitry to generate the trace stream, wherein the trace stream comprises header items and payload items, wherein each payload item is associated with a header item and the header item provides interpretation information for the payload item,
and the trace stream generation circuitry is capable of grouping a set of header items together into a contiguous sequence of header items in the trace stream and grouping a set of payload items together into a contiguous sequence of payload items in the trace stream;
wherein the contiguous sequence of header items comprises a variable number of header items; and
the trace stream generation circuitry is configured to pad at least one of the contiguous sequence of header items and the contiguous sequence of payload items to generate the trace stream in which:
  the contiguous sequence of header items has a length which is a multiple of a predetermined length, wherein the predetermined length is a memory alignment boundary length;
  the contiguous sequence of payload items has a length which is a multiple of the predetermined length; or
  the contiguous sequence of header items and the contiguous sequence of payload items together have a length which is a multiple of the predetermined length.

\* \* \* \* \*